United States Patent Office 3,508,382
Patented Apr. 28, 1970

3,508,382
ADSORPTION PROCESS FOR ACIDIC GASES
Richard Joseph Schoofs, Moraga, Calif., and Robert John Kulperger, Weston, Ontario, Canada, assignors to Union Carbide Corporation, a corporation of New York
No Drawing. Filed Mar. 13, 1968, Ser. No. 712,610
Int. Cl. B01d 53/02
U.S. Cl. 55—73
2 Claims

ABSTRACT OF THE DISCLOSURE

The adsorptive capacity of zeolitic molecular sieves for sorbable acidic compounds such as carbon dioxide is greatly enhanced by adsorbing relatively small amounts of ammonia on the zeolite in an activated state prior to contacting same with the acidic compound or a gas stream containing such acidic compound.

This invention relates to a process for selectively adsorbing acidic compounds from gas streams containing same using as the adsorbent a zeolitic molecular sieve modified by having adsorbed thereon a relatively small quantity of ammonia.

The class of crystalline zeolites now well known as zeolitic molecular sieves exhibit adsorptive properties useful in separating one or more components from fluid mixtures. By selecting the appropriate molecular sieve with respect to the composition of the fluid mixture concerned, it is possible to preferentially or selectively adsorb and thus reduce the concentration of or completely remove a constituent of the fluid mixture. It is the general understanding of those skilled in the art that the selectivity or preference of a zeolitic molecular sieve is based on a number of factors which include the molecular size of the fluid components with respect to the effective diameter of the uniform pores of the zeolite and also the polar nature of the molecules to be adsorbed. For any particular molecular sieve zeolite, it is also known that the adsorptive capacity and selectivity for a given adsorbate can, to some degree, be modified by altering the type of cation normally present in the zeolite structure, such cations being those which electrovalently balance the $AlO_4$ tetrahedra which in conjunction with $SiO_4$ tetrahedra form the basic three-dimensional framework of the zeolite crystal. In the case of the synthetically prepared molecular sieve now widely identified as zeolite A (U.S. Patent No. 2,882,243), for example, the form in which the cations are sodium has pore diameters of about 4 angstrom units, whereas the form produced by exchanging the sodium ions for potassium or calcium cations exhibits pore diameters of about 3 angstrom units and 5 angstrom units, respectively.

In many instances, a given zeolitic molecular sieve exhibits a marked preference for one molecular species of a molecular mixture, but does not entirely exclude one or more other molecular species which are present. In such circumstance, it has been formerly proposed to alter the adsorptive characteristics of the zeolite by pre-introducing into the dehydrated molecular sieve a quantity of a non-aqueous or dehydrated polar adsorbate such as ammonia or an ammonia derivative such as methylamine. The modification effected thereby is disclosed in U.S. Patent No. 2,930,447 as resulting in a general decrease in the adsorptive capacity for all molecules which are capable of passing through the zeolite pores, but also a disproportionate decrease for certain molecules so that relatively the adsorptive capacity for certain other molecules may be viewed as being enhanced.

In the purification of gas streams used in commercial processes, particular problems have been encountered in the removal of acidic components which are usually, but not necessarily, present in relatively small concentrations, but which are extremely poisonous toward catalyst compositions, or if vented to the atmosphere, cause serious air pollution detrimental to animal and/or plant life.

To a degree these problems have been solved by resorting to adsorbent beds of zeolitic molecular sieve to adsorb and isolate the undersirable component. In fact, properly chosen zeolitic molecular sieve adsorbents have been demonstrated to be capable of effectively removing essentially 100% of acidic impurities from gas streams even when these impurities are present in only trace amounts, i.e., a very few parts per million by volume. Under such circumstances molecular sieves in general have a relatively small capacity for most of these compounds, and in many applications very large molecular sieve beds have been required. Where smaller beds have been used it has been necessary to interrupt frequently the adsorption process and regenerate the molecular sieve.

It is accordingly the general object of the present invention to improve the efficiency of any zeolitic molecular sieve adsorbent bed with respect to acidic compound impurity removal from gas stream by increasing the capacity of the zeolite to adsorb said acidic compounds.

In the accomplishment of the aforesaid object, it has surprisingly been found that zeolitic molecular sieve beds which have been precontacted with ammonia while the zeolite is in an activated state such that there is adsorbed thereon from about 0.1 to about 10 weight percent ammonia based on the dry weight of the zeolite, do not exhibit a decreased capacity for acidic gases but rather exhibit a remarkable increase in their capacity to extract and retain these impurities from gas streams containing same over the entire possible impurity concentration range, i.e., from essentially zero to 100 percent, but especially for streams containing less than about 10% of an acidic gas species as an impurity.

The crystalline structure and chemical composition of the molecular sieve useful in this invention is not a critical factor provided only that it possesses pores sufficiently large to adsorb ammonia and the molecules of the acid gases sought to be removed, i.e., will not exclude from the internal cavities of the zeolite structure either the acid gas molecule or ammonia. Although the pore size of the given zeolite is subject to minor variation with respect to certain factors such as temperature and the maximum dimension of the minimum projected cross section of a molecule is similarly affected by the energy state of the molecule, it will suffice herein to regard as necessary that the zeolitic molecular sieves have a pore diameter of at least 3 angstrom units.

Illustrative of but by no means the only molecular sieve zeolites advantageously employed in the practice of this invention are zeolite A (U.S. Patent No. 2,882,243); zeolite Y (U.S. Patent No. 3,130,007); zeolite L (U.S. Patent No. 3,216,789); zeolite W (U.S. Patent No. 3,012,853); zeolite T (U.S. Patent No. 2,950,952); zeolite R (U.S. Patent No. 3,030,181); zeolite X (U.S. Patent No. 2,882,244); zeolite S (U.S. Patent No. 3,054,657). The patents listed in conjunction with the zeolite designations disclose in detail the composition and method of preparation of the foregoing synthetic zeolites. It will be understood that the pore diameters of zeolites can vary depending upon the nature of the cations present in the crystal structure. In some instances, for example, zeolite A, when the sodium cations present in the as-prepared form are exchanged for more than 50 percent of potassium cations, the effective pore size is decreased to a degree sufficient to partially restrict the adsorption of an acid gas such as $CO_2$. Calcium cation exchange of zeolite A to the same degree, however, results in an enlargement of the effective pore size beyond that of the sodium cation form of the zeolite. Accordingly, it is not only necessary to select a given zeolite for the present process, but also consideration should be given the particular cation form employed.

Natural zeolites such as chabazite, erionite, gmelinite, mordenite, clinoptilolite and faujasite are also suitably utilized. Other zeolites which are not of the three-dimensional crystalline molecular sieve type, as for example, the permutites commonly used as water softeners are not suitable.

The acidic compounds which comprise the impurities sought to be removed from gas streams in accordance with this invention are carbon dioxide, hydrogen sulfide, carbon disulfide and alkyl thiols of the formula RSH in which the alkyl radical R contains from 1 to 5 carbon atoms. One or more of these compounds, all of which exhibit an acidic character toward ammonia, are common impurities in gas streams employed in petroleum hydrocarbon alkylation, cracking, the preparation of liquefied petroleum gas, ammonia synthesis, air liquefaction and fractionation, natural gas liquefaction, and the like and hence the gas streams containing the aforesaid acidic gas impurities contain at least one or a mixture of two or more of nitrogen, hydrogen and alkanes and alkenes containing from 1 to 6 carbon atoms.

The method of pre-loading ammonia on the zeolites is not a critical factor. Ordinarily and conveniently a stream of ammonia alone or in combination with an inert gas such as hydrogen or nitrogen is passed over the zeolite which has been activated by heating to remove a substantial amount, preferably substantially all, of the water present in the zeolite internal cavities when the zeolite is crystallized from an aqueous reaction mixture or gel. Under the same conditions not all zeolitic molecular sieves will adsorb the same quantity of ammonia in a given time, but simple routine tests are readily made to determine optimum ammonia loading conditions for any given zeolite.

The activated zeolite bed thus loaded with from 0.1 to 10 weight percent ammonia is thereafter placed on stream, i.e., in the conduit system of a gas stream containing the acid gas impurity and the said gas stream permitted to pass over the bed. During adsorption of one or more of the acid gases, the bed temperature is not critical and can range from about −50° C. to about 100° C.

The present process and the improvement resulting therefrom are illustrated by the following examples:

EXAMPLE 1

Two samples of pelletized molecular sieve crystals which had been activated by heating in vacuo at 350° C., one being of the calcium form of zeolite A and having effective pore diameters of about 5 angstrom units and the other being the sodium form of zeolite X having effective pore diameters of about 8 to 9 angstrom units were placed in individual columns and contacted at 550° F. at a pressure of 70 p.s.i.a. with a dry nitrogen stream containing 2 volume percent ammonia at a flow rate of 155 cubic feet per hour. The ammonia-containing streams were fed to the beds until an equilibrium ammonia loading was accomplished in each case. The calcium zeolite A sample was found to be loaded with 2.1 weight percent ammonia and the sodium zeolite X sample contained about 1.1 weight percent adsorbed ammonia.

EXAMPLE 2

To compare the capacity of the zeolite samples with and without adsorbed ammonia, two additional samples of the calcium zeolite A and sodium zeolite X used in Example 1 were activated (dehydrated) under identical conditions to those of Example 1 and each placed in columns identical to those in which the samples of Example 1 were pre-loaded with ammonia. Through each sample-containing column was passed a feed stream of air containing 300 volume parts per million $CO_2$ and 1200 volume parts per million $H_2O$ at a pressure of 35 p.s.i.a., a flow rate of 2.5 cubic feet/min. and at a temperature of 75° F. The feed stream was maintained in each case until substantial equilibrium loading of the bed had occurred. The breakthrough and $CO_2$ adsorption data is shown in tabular form below:

TABLE I

| Sample No. | Zeolite | Ammonia preload, wt. percent | Breakthrough time, min. | Stoichiometric loading, $CO_2$ wt. percent |
|---|---|---|---|---|
| a | Calcium zeolite A | 2.1 | 78 | 2.0 |
| b | Calcium zeolite A | 0 | 52 | 1.2 |
| c | Sodium zeolite X | 1.1 | 90 | 1.5 |
| d | Sodium zeolite X | 0 | 47 | 1.1 |

As is readily observed from the data, the $CO_2$ capacity of the ammonia pre-loaded zeolite in each instance was vastly improved.

EXAMPLE 3

To demonstrate that ammonia pre-loaded zeolites containing adsorbed $CO_2$ are capable of complete regeneration, the ammonia and $CO_2$ loaded sample c of Example 2 was subjected to a cocurrent purge of nitrogen at 500° F. After the ammonia and $CO_2$ had been completely purged, the sample was again contacted under the same conditions with the same air stream containing $CO_2$ and $H_2O$ as employed in Example 2. The $CO_2$ capacity was found to be nearly identical with that of sample d of Example 2.

EXAMPLE 4

Two samples of sodium zeolite X were activated by heating in vacuo at 350° C. for identical periods of time. After activation each sample weighed 39.8 grams. One sample was preloaded with 0.37 gram ammonia. Both samples were contacted under static conditions for 24 hours at a temperature of 25° C. and at a pressure of 115 p.s.i.a. with nitrogen gas containing carbonyl sulfide (COS). At the end of the 24 hour period, the COS vapor concentration in the nitrogen over the ammonia preloaded sample was found to be 13 parts per million by volume whereas in the case of the comparison sample the COS concentration in the nitrogen was 171 parts per million by volume.

EXAMPLE 5

Two adsorbent beds of equally activated zeolite L, one of which contains preloaded thereon 6 weight percent ammonia and the other containing no preloaded ammonia are contacted with gas streams at a temperaure of 50° C. and 100 p.s.i.a. The gas streams consist of equal parts by volume of ethylene, propylene, ethane, and propane and contain as impurities 10 p.p.m. by volume of each $H_2S$, $CS_2$ and methyl mercaptan. It is found that breakthrough with respect to impurities (the first impurity to break through being $CS_2$) requires more than a 50 percent longer period in the case of the ammonia preloaded bed than with the bed free ammonia.

In the example above, one of the impurities is an alkyl mercaptan which has a molecular size requiring that the pore size of a suitable molecular sieve adsorbent should be at least about 4 angstrom units. It should be understood that while most of the acidic impurities may be adsorbed employing a zeolitic molecular sieve having a pore size of at least 3 angstrom units, larger pores may serve beneficial in permitting faster rates of adsorption. When the alkyl mercaptan comprises a branched chain-type compound then a pore size larger than about 6 angstrom units should be employed.

EXAMPLE 6

Two adsorbent beds of equally activated zeolite L, one of which contains preloaded thereon 6 weight percent ammonia and the other containing no preloaded ammonia are contacted with gas streams at a temperature of 50° C. and 100 p.s.i.a. The gas streams consist of nitrogen containing as impurities approximately 20 p.p.m. each of $NO_2$ and $SO_2$. It is found that the time to breakthrough is more than 50 percent longer in the test involving the preloaded ammonia.

What is claimed is:

1. In the process for removing from a gas stream at least one impurity contained therein selected from the group consisting of COS, $CS_2$, $H_2S$, $SO_2$, $NO_2$ and alkyl mercaptans containing from 1 to 5 carbon atoms, by selective adsorption of said impurity on a zeolithic molecular sieve, the improvement which comprises feeding said gas stream through a bed of an activated crystalline zeolitic molecular sieve having a pore size large enough to adsorb ammonia and at least one of the said impurities present in said gas stream, said molecular sieve having preadsorbed thereon from about 0.1 to about 10 weight percent ammonia based on the weight of the activated molecular sieve.

2. The process according to claim 1 in which the gas stream containing the impurity contains at least one member selected from the class consisting of $H_2$, $N_2$, an alkene containing from 1 to 6 carbon atoms and an alkane containing from 1 to 6 carbon atoms.

References Cited

UNITED STATES PATENTS 2,992,703  7/1961  Vasan et al. _____ 55—75 X

JAMES L. DECESARE, Primary Examiner

U.S. Cl. X.R.

55—75